United States Patent [19]
Wagner

[11] Patent Number: 6,085,224
[45] Date of Patent: Jul. 4, 2000

[54] METHOD AND SYSTEM FOR RESPONDING TO HIDDEN DATA AND PROGRAMS IN A DATASTREAM

[75] Inventor: Richard H. Wagner, Dunwoody, Ga.

[73] Assignee: Intracept, Inc., Atlanta, Ga.

[21] Appl. No.: 08/818,788

[22] Filed: Mar. 11, 1997

[51] Int. Cl.[7] ................................................ G06F 15/16
[52] U.S. Cl. ................................... 709/203; 709/219
[58] Field of Search ........................... 709/203, 217–219

[56] References Cited

U.S. PATENT DOCUMENTS

| | | | |
|---|---|---|---|
| 5,736,984 | 4/1998 | Jellinek et al. | 345/338 |
| 5,778,372 | 7/1998 | Cordell et al. | 707/100 |
| 5,809,250 | 9/1998 | Kisor | 709/227 |
| 5,826,242 | 10/1998 | Montulli | 705/27 |
| 5,848,412 | 12/1998 | Rowland et al. | 707/9 |
| 5,852,717 | 12/1998 | Bhide et al. | 709/203 |
| 5,857,191 | 1/1999 | Blackwell, Jr. et al. | 707/10 |
| 5,861,883 | 1/1999 | Cuomo et al. | 345/326 |
| 5,867,651 | 2/1999 | Dan et al. | 709/203 |
| 5,878,384 | 3/1999 | Johnson et al. | 702/187 |
| 5,987,611 | 11/1999 | Freund | 713/201 |
| 6,011,537 | 2/1999 | Slotznick | 345/115 |

OTHER PUBLICATIONS

Catledge, L. et al., "Characterizing Browsing Strategies in the World–Wide Web," Computer Networks and ISDN Systems, vol. 27, No. 6, pp. 1065–1073, Apr. 1995.

Doorn, M., et al., "Integrating Applications and the World–Wide Web, " Computer Networks and ISDN Systems, vol. 27, No. 6, pp. 1105–1110, Apr. 1995.

Kristol, D., et al., "HTTP State Management Mechanism," RFC 2109, Network Working Group, pp. 1–21, Feb. 1997.

"Luckman's Anonymous Cookie for Win95"; http://www6.zdnet.com/cgi–bin/texis/swlib/hotfiles/info.html?f-code=000G3K; ZDNet Software Library, Jun. 1997.

(List continued on next page.)

*Primary Examiner*—Zarni Maung
*Assistant Examiner*—Andrew Caldwell
*Attorney, Agent, or Firm*—Morris, Manning & Martin, LLP

[57] ABSTRACT

A system and method for detecting trigger events in datastreams received over a computer communication network is disclosed. The system includes an interceptor for intercepting datastreams from a computer network intended for an application program; a scanner for scanning the intercepted datastream for trigger events, such as cookie data, script commands, and applet programs; and an event response generator for processing detected trigger events. Configuration data is used to identify a response for trigger events such as disabling script commands or programs and deleting or modifying cookie data. The event indicators and an action menu are generated by the event response generator and delivered with the processed datastream to the application program. The application program displays the event indicators so the user is made aware of the trigger events and the action menu allows a user to respond to the detected trigger events. In the preferred implementation, the user may respond by obtaining information about the site which transmitted the datastream having the trigger events and then send e-mail to the administrator of the site. Other actions include modifying the configuration data so subsequent datastreams with the trigger event is passed by the system. Outbound messages from the application program are also intercepted and scanned for trigger events. In the preferred implementation, the configuration data are exchanged between the system and the application program so the user may modify the operation of the system. The configuration data are deleted from the outbound datastream before it is transmitted in the preferred implementation. The system and method of the present invention allow a user to view detected trigger events which otherwise would occur without the user's knowledge and provides the user with sufficient information so the user can make an informed decision as to whether to accept trigger events in a datastream from another site.

40 Claims, 6 Drawing Sheets

OTHER PUBLICATIONS

"CyberMedia Announces Beta Availiablity of PC Guard Dog Internet Security and Privacy Software"; http://www.cybermedia.com/pr/dog.html; CyberMedia Ships UnInstaller 4.5 Jun. 1997.

"Kookaburra Software"; http://www.kburra.com; Kookaburra Software Apr. 1997.

"ZDNet's CookieMaster"; http//www6.zdnet.com/cgi–bin/texis/swlib/hotfiles/info.html?fcode=000CKP; ZDNet Software Library May 1997.

"Cookie Crusher"; http://www.download.com/PC/Result/TitleDetail/0,4,0–25023,00.html Mar. 19,1987.

"PGPcookie.cutter for Windows NT 4.0"; http://pgp.com/products/PGPcookie.cgi Jun. 1997.

"CyberMedia Announces Beta Availiablity of PC Guard Dog Internet Security and Privacy Software"; http://www.cybermedia.com/pr/dog.html; CyberMedia Ships UnInstaller 4.5 Jun. 1997.

"NSClean Privacy Software"; http://www.wizvax.net/kevinmca/nscnt401.html, Jul. 1997.

"Cookie Software"; http://www.cookiecentral.com/files.htm, Apr. 1997.

"PC Secure Personal Firewall"; http://www.softwarebuilders.com/SBI_Mall/PC_Secure.html, Jul. 1997.

"Finjan partners: Finjan Distributors & Resellers Worldwide"; http://www.finjan.com/web.html, Jul. 1997.

"C is for Cookie"; Bott, Ed; WWW.PCCOMPUTING.COM; pp.326–327; Jul. 1997.

NSClean32 4.06 Information "Why is there an NSClean program?" Jul. 1997.

```
<INPUT TYPE="checkbox" name="b1" >
    Allow the Web Page to temporarily store data while it is displayed in your browser's
    window<br>

<INPUT TYPE="checkbox" name="b2" >
    Allow the Web Page to store data on your disk drive and leave it there<br>

<INPUT TYPE="checkbox" name="b3" >
    Allow the Web Page to send the data it stored on your computer back to the Web Site<br>

<INPUT TYPE="checkbox" name="b4" >
    Allow the Web Page to request data from other Web Sites to be displayed in your
    browser's window<br>

<INPUT TYPE="checkbox" name="b5" >
    Allow the Web Page to request data from other Web Sites that may be stored on your
    computer<br>

<INPUT TYPE="checkbox" name="b6" >
    Allow the Web Page to run programs in your browser's display window<br>

<INPUT TYPE="checkbox" name="b7" >
    Allow the Web Page to run programs on your computer<p>

<INPUT TYPE="checkbox" name="b8" >
    Restrict sending browser and user email information to the Web Site<br>

<INPUT TYPE="checkbox" name="b9" >
    Do not receive continuous advertisements or page updates from the Web Site<br>

<INPUT TYPE="checkbox" name="b10" >
    Disable all disk file reads and writes while connected to the Internet<br>

<INPUT TYPE="button" VALUE="RESET PAGE"
onClick="modify_restrictions(this.form)">
</FORM>
```

FIG. 3

```
<SCRIPT>
function modify_restrictions(theform)
{       x = new MakeArray(10);
        x[1] = ( thisform.b1.checked) ? "1" : "0";
        x[2] = ( thisform.b2.checked) ? "1" : "0";
        x[3] = ( thisform.b3.checked) ? "1" : "0";
        x[4] = ( thisform.b4.checked) ? "1" : "0";
        x[5] = ( thisform.b5.checked) ? "1" : "0";
        x[6] = ( thisform.b6.checked) ? "1" : "0";
        x[7] = ( thisform.b7.checked) ? "1" : "0";
        x[8] = ( thisform.b8.checked) ? "1" : "0";
        x[9] = ( thisform.b9.checked) ? "1" : "0";
        x[10] = ( thisform.b10.checked) ? "1" : "0";

iv = "iv=";
        for ( var i = 1; i < 11; i++)
                iv = iv + x[i];

document.cookie = iv;
        history.go(0);
}
</SCRIPT>
<FORM>
```

METHOD AND SYSTEM FOR RESPONDING TO HIDDEN DATA AND PROGRAMS IN A DATASTREAM

FIELD OF THE INVENTION

This invention relates to detecting hidden data in a datastream, and, more particularly, to detecting hidden data in a datastream communicated over an open network.

BACKGROUND OF THE INVENTION

Open networks, such as the Internet, are well known. Open networks permit a large number of computers and networks to be coupled to one another without requiring the application programs which communicate over the network to implement communication protocols. Instead, each computer includes a hardware component which forwards data messages received from one computer to the next computer. The data message is also examined to determine if the communication is for the particular computer forwarding the message. If it is, the data message is processed by a communication stack and provided to an application program on the computer. In this manner, a data communication is continuously passed along the network until it reaches a destination computer defined in the message. Scattered throughout this open network are a number of computers known as routers. Routers include tables of addresses for servers which couple other subnetworks to the open network. The routers use these tables to facilitate the forwarding of data messages to a server which couples the computer at the destination address in the data message to the open network.

The communication stack which processes data messages for a computer is a group of programs that correspond to communication layers which are executed sequentially in a manner which visually resemble a stack. On the Internet, the communication stack implements a Transport Control Protocol/Internet Protocol (TCP/IP). The implementation of this protocol is usually perceived to include at least three layers of processing. The first layer is a data link layer which maps an address from the hardware component to an Internet address for messages inbound to the computer and maps an Internet address to a hardware address for outbound messages. The next layer in the stack is the network layer which verifies that the network protocol parameters for the data communication are correct. Finally, the transport layer verifies that the datastream portion of the communication has been properly delivered and makes the datastream available for an application program. Datastream as used herein refers to the data segment used or generated by an application program and any header and trailer required for its communication. The communication stack allows application programs to communicate datastreams between one another without requiring the application programs to implement the transport, network, data link and hardware parameters necessary to communicate information from an application on one computer to an application on another computer.

A popular datastream protocol over the Internet is the Hypertext Transport protocol (HTTP). This protocol is used to transfer and display information, usually in a graphic format, from one computer to another. The files containing the information to be displayed are usually written in the Hypertext Markup Language (HTML). The HTML language includes commands which are executed by a program at the receiving computer. The files also include identifiers for files which include information to be displayed. These file identifiers are typically known as Universal Resource Locators (URL). The program at the receiving computer which displays information received from another computer in an HTML file or which returns user information to the program which sent the HTML file is commonly known as a browser. These browsers are typically referred to as client programs and the computers sending HTML files and the files corresponding to URLs within the HTML files are known as servers. The portion of the Internet which communicates in the HTTP protocol is usually referred to as the World Wide Web (WWW).

In a response to a request for a page sent by a browser, a server sends multiple HTML files which comprise the page in messages implemented in the HTTP protocol. When the HTML file or files are received by the computer executing the browser, each communication stack layer performs its function until a datastream containing an HTTP header and corresponding data segment is presented to the browser. One portion of the browser verifies that the information and the HTTP header have been accurately delivered to the application program. The browser then displays the data delivered in the HTML files received from the server. Because the TCP/IP protocol used for the Internet is a packet communication protocol, several messages are probably required before a complete file is available for display. Besides graphical data, the HTML file also contains data and/or commands which may not be displayed at the browser. This "hidden" data and/or commands may be used to cause the computer executing the browser to store information or execute programs without the user's knowledge of the existence or purpose of the information or program.

One known data field which may be included in the HTTP header of an HTML file is a "cookie" data field. A cookie is an HTTP protocol header document element which may be used to provide multiple data elements to the browser. In response to receiving an HTML file with a cookie, the browser may store the cookie data elements in a "cookies.txt" file which is usually kept in the root directory for the browser. Once cookie data are sent to the browser computer, the server expects the cookie data to be returned in the HTTP header of subsequent messages sent from the browser to the server. The inclusion of the cookie data in the HTTP header of messages from the browser is done without the user's awareness. In this manner, the operator of the server may identify repeat visitors to the server site. Other known methods of passing cookie data to a client program include using a Javascript data object or a Javascript program that accesses the "cookies.txt" file stored at the client computer. While the storage of a cookie file may appear harmless, it is nevertheless the unauthorized storage of data on another's computer and the file may be used for tracking the user and his or her requests for information from the server site without the user's knowledge or permission.

Some known programs may be used to scan HTTP headers of HTML files and requests before the files are processed by a user's browser or the request from a browser is sent to the communication stack for transmission. These programs may be used to detect cookie data in incoming files and outgoing requests. These programs allow a user to activate a function which notifies the user of cookie data in HTTP headers of incoming HTML files. The user may also activate a function of the program to delete the cookie data from the HTTP header of incoming file so it is not passed to the browser program and stored in the cache memory for the browser. If the cookie data is stored in the cache memory for the browser, the browser incorporates the cookie data in the HTTP header of outgoing HTML GET or PUT requests from the browser. These previously known programs may be used to notify the user of cookie data in the HTTP headers of the outgoing requests and to delete the cookie data from the HTTP headers independently of notification of cookie data for incoming files. These programs are separate from a user's browser and thus, may be advantageously added to a user's system without modifying the executable code for implementing the browser program. While these previously known programs may be used to selectively notify a user of the presence of cookie data in an HTTP header or to delete cookie data from an HTTP header, these programs do not detect other hidden data which a user may want to know is being passed to the user's browser or want to delete from an HTML file or request.

Recently, powerful interpretive languages have been developed which may be executed in a browser. Known interpretive languages are JAVA developed by Sun Microsystems, Javascript developed by Netscape Communications Corporation, and Visual Basic Script developed by Microsoft Corporation. Because each one of these languages are interpreted, a program written in one of these languages does not need to be compiled with prior knowledge of the computer on which it will execute. Instead, the interpreter executes within the application space for the application program, such as the browser, and this interpreter executes statements received in a file containing the interpretative language statements. Files containing interpretive language statements are known as applets. While applets have a number of beneficial purposes, they may also cause problems. For example, a JAVA applet may be imbedded in an HTML file, sent to a user's computer and executed by an interpreter in the browser without the user's knowledge. Such programs may be used to gain unauthorized access to resources or data on the user's computer. Additionally, these interpretive language programs may include cookie commands that identify tracking data as discussed above. These cookie commands are part of the data segment of a datastream for a browser and not part of the HTTP header. As a result, these cookie commands are not detected by the programs that may be used to detect and delete cookie data from HTTP headers.

To address the need to detect interpretive language programs and cookie commands data segments of datastreams, some known browsers have been modified to include a function which a user may activate to prevent the execution of interpretive language programs and cookie commands. Typically, the browser is modified so the portion of the browser program that passes an interpretive language program or cookie command to an interpreter for execution, checks a switch which may be set by a user, to determine whether passing programs and commands to the interpreter is enabled. While these modified browsers disable the execution of interpretive programs and cookie commands, they do not notify a user that an interpretive program or cookie command was detected. Thus, users are unaware of those server sites that attempt to send interpretive programs and cookie commands to the user's browser and, as a result, the user may deactivate the interpretive program and cookie command disabling function of the browser. Thereafter, the user may request an HTML file from a server previously visited and receive an interpretive program or cookie command that now executes on the user's computer. If the user had known the server site was sending interpretive programs or cookie commands, the user may have chosen not to request files from the server.

What is needed is a program which detects programs or cookie commands embedded within a datastream received from another computer and which notifies the user of the interpretative language program or cookie command so the user may be aware that the server is sending interpretive programs or cookie commands. What is needed is a program which notifies the user of detected interpretive programs and cookie commands without modifying the browser program. What is needed is a way to restrict access to resources or data on a computer when the computer is in communication with another computer.

SUMMARY OF THE INVENTION

The above limitations of previously known cookie detecting programs are overcome by a system and method made in accordance with the principles of the present invention. The system of the present invention includes an interceptor for intercepting a datastream before the datastream is received by an application program, a scanner for scanning the intercepted datastream to detect a trigger event in the intercepted datastream, and an event response generator for generating a response to the detected trigger event in correspondence with event configuration data. Preferably, the detected trigger event is displayed with an action menu to facilitate the user's consideration of appropriate responsive actions. For example, in response to a display of a detected program command, a user may activate an action in the action menu to delete, disable or enable the detected program command. In another example, a user may specify an action which modifies or deletes a cookie file contained in a datastream.

In a preferred embodiment of the present invention, the interceptor is a program which overloads a portion of the socket program that communicates directly with the transport layer. Thus, the interceptor can receive a datastream from the transport layer prior to its delivery to an application program and can receive a datastream to be sent to another computer before it is received by the transport layer for transmission to the other computer. Alternatively, the interceptor may execute in the application space with an application program, usually a browser, and intercept datastreams to and from the application program before they are processed by the application program or sent to the transport layer, respectively.

Preferably, the scanner of the present system detects fields in datastream headers, embedded identifiers, embedded commands and unidentified file requests in datastreams. The embedded identifiers and embedded commands are usually detected in incoming datastreams to the application program. The unidentified file requests are usually contained within outgoing datastreams. These unidentified file requests are preferably detected by comparing the addresses of the requested files or URLs to verify they are coming from the server site currently in communication with the user's computer. If the requested file or URL is not stored at the server site, the system of the present invention determines whether the user has authorized receipt of files from server sites other than the one with which the user's system is currently communicating. If such receipt has not been authorized, the file is not passed to the application program for viewing and an alert is provided to the user that the server attempted to send a file or files from another server.

Preferably, the action menu presented by the event response generator provides a user with options to (1) generate an electronic (E-mail) message to the system administrator who operates the server site which caused the trigger event, (2) terminate the communication session with the server site which caused the trigger event, or (3) modify configuration data corresponding to the server site which is used to process detected trigger events. Configuration data are a user's identification of the types of actions the inventive system performs for the hidden data elements or commands detected in datastreams. For example, if a user needs to allow the downloading of applet files and the commands to execute them in order to view a desired resource from a server site, then the user may permit such program downloading and command executions. The event response generator also generates and stores a log of each trigger event. The log records for the trigger events preferably include the time of the trigger event, identification of the source of the trigger event, the type of trigger event, and any file which may have been received as a result of the trigger event. The user may view this event log to ascertain what various server sites are providing in datastreams to an application program which otherwise would be undetected.

In the method of the present invention, an inbound datastream is intercepted prior to it being delivered to an application program. The datastream is then scanned for trigger events and processed according to the configuration data for the server site. If the configuration data indicates that script programs are to be disabled, for example, any script program in the datastream is disabled so it cannot be executed by the browser. The detected trigger events are then logged and a data envelope containing event indicators and an action menu is generated and coupled to the processed datastream. The browser program then displays the processed datastream, the event indicators and the action menu. The user may select actions in the action menu to view detected trigger events or initiate control actions. For example, a user may view a disabled script program and conclude its execution is acceptable to the user. The user may then modify the configuration data to allow script program execution and then cause the browser to request the page from the server again. Upon receipt of the requested page, the system of the present invention does not disable the script program and it will execute when the datastream is passed to the browser.

Another action available to a user is to obtain information about the server site which sent the detected trigger events. Preferably, information regarding the server site is obtained by establishing an HTTP session, although a Telnet session may be used, with Internic, the Internet domain name registration service, to retrieve information regarding the Web site owner using the WHOIS service query. The retrieved information includes the computer system administrator's name and electronic mail address. Alternatively, information about the Web site may be obtained directly from the Web site using a FINGER query. Once this type of information about the server site has been obtained, the user may use the action menu to send an E-mail message to the identified company and/or administrator of the server site. Alternatively, the user may decide to abort the current application session with the server site or modify the configuration data for the server site so subsequent files containing trigger events are not disabled. After the user selects an appropriate action, the action is executed. The method then returns to await the interception of the next datastream.

In another aspect of the present invention, input/output (I/O) operations to the disk drives of the computer system may be disabled whenever the computer initiates communication with another computer over a network. In this embodiment, RAM memory is used to store data received over a network from the other computer. The user may re-enable disk I/O operations by modifying configuration data corresponding to the computer which is communicating with the user's computer. If the user does not re-enable disk I/O during the communication session with another computer, files stored in RAM during the communication session may be stored to a disk drive after the communication session is over. In this way, a user may view the data stored in RAM to learn whether a computer has attempted to pass hidden data or programs to the user's computer before storing files received from another computer.

In another preferred aspect of the present invention, a specially defined cookie data field is used to communicate an action map of the configuration data between a program implementing the present invention and the application program. The cookie data field includes action map data which is used to define the actions for various trigger events processed by the inventive system. When an application program first accesses a server site through the communication stack, the system and method of the present invention intercept the datastream sent by the server site and populate a cookie data field in the header of the datastream with a default action map value for delivery to the application program. This cookie data field is preferably inserted in the HTTP header of the HTML file containing the processed datastream before it is provided to the application program. As the user selects options in the action menu, the data values in the default action map of the cookie data field are modified accordingly. When the application program provides a response to the server site, the system and method of the present invention intercept the datastream and extract the modified action map data in the cookie data field of the response. If the default action map values have been modified, they are used to modify event configuration data that defines the trigger events to be processed. The action map and event configuration data are stored with an identifier which corresponds to an address for the server site. This data is then used to scan and detect trigger events in subsequent communications with the server site. The action map data is deleted from the outbound datastream before it is provided to the communication stack for transmission to the server site. Thus, any subsequent communication with a server site causes the system to first determine whether corresponding cookie action map data has been defined for the server site, and if it has, use the values in the cookie action map data for scanning the datastream. If no corresponding configuration data are found for a server site when an incoming datastream is received, default action map and event configuration data are used to process the incoming datastream. In this manner, the system and method of the present invention may communicate configuration data with the application program in a manner that is transparent to the computers with which the application program is communicating over the network.

These and other benefits and advantages of the present invention may be ascertained from the general description given above and the detailed description given below.

BRIEF DESCRIPTION OF THE DRAWINGS

The accompanying drawings, which are incorporated and constitute a part of the specification, illustrate preferred and alternative embodiments of the present invention and, together with a general description given above and the detailed description of the embodiments given below, serve to explain the principles of the present invention.

DETAILED DESCRIPTION OF THE INVENTION

Figure 1:
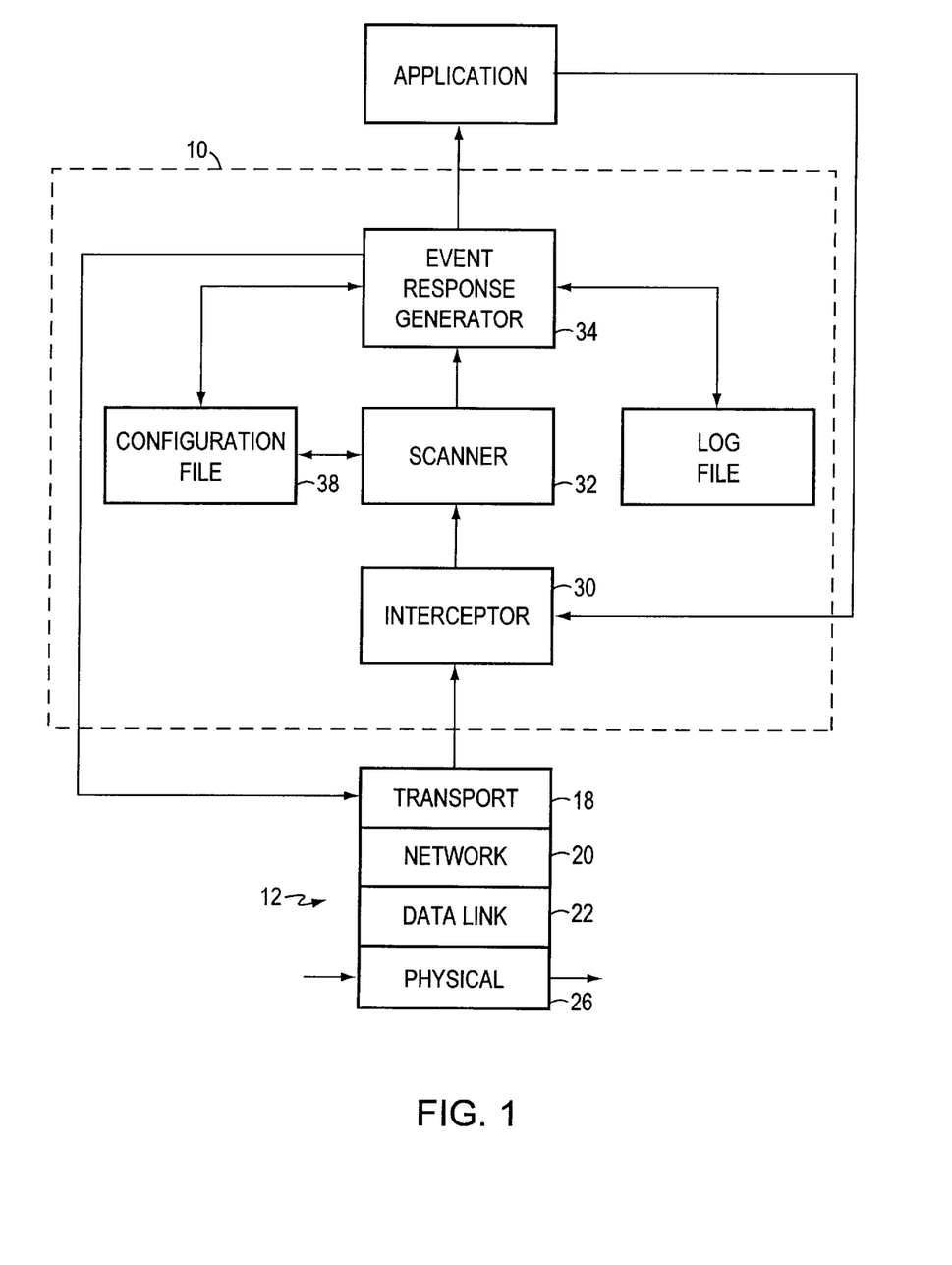
FIG. 1 is a block diagram of a system incorporating the principles of the present invention.

System 10, as shown in FIG. 1, includes an interceptor 30 for receiving datastreams either from communication stack 12 before they are processed by the application program or from the application program before they are encapsulated by communication stack 12. Scanner 32 scans the data elements of a datastream to detect trigger events within the datastream. Datastreams which do not contain trigger events are, preferably, passed by scanner 32 to event response generator 34 which includes an action menu with the datastream before providing the processed datastream to the application program. Event response generator 34 disables detected trigger events in accordance with configuration data from configuration file 38. Preferably, event response generator 34 includes in the header of the processed datastream, the action map data from the configuration data used to process the trigger events. Event response generator 34 also generates event indicators for the detected trigger events and includes an action menu, as noted above, for display by the application program. The event indicators and action menu are coupled to the processed datastream which is passed to the application program. Preferably, the event indicators and action menu are HTML data and HTTP header data for an HTML file which is coupled to the processed HTTP datastream. Preferably, the action menu is implemented by a Javascript program or command which is preferably included in the HTML file coupled to one end of the processed datastream.

System 10 may execute in the process space of an application program, such as a browser, or the process space of a communication program, such as a WINSOCK program. A browser typically communicates datastreams with servers using the HTTP protocol over an open network such as the Internet. A communication program establishes a communication session between the application program and communication stack 12. The communication program communicates with communication stack 12 so system 10 is coupled to a network. As explained above, communication stack 12 includes transport layer 18, network layer 20, data link layer 22, and hardware component 26. When system 10 executes in the process space of a communication program, it overloads a portion of the communication socket program to "hook" or intercept datastreams being communicated to and from the application program. A WINSOCK communication program used in the preferred embodiment of the present invention is the WINSOCK COMPONENT ARCHITECTURE program available from Stardust Technologies, Inc. of Campbell, Calif. When system 10 executes in the process space of the application program, it intercepts and processes datastreams from the communication program, such as a WINSOCK program, before determining whether to provide them to the application program. Likewise, it intercepts and processes datastreams from the application program before determining whether to provide them to the communication program.

For datastreams generated by the application program, interceptor 30 intercepts the outbound datastream and scanner 32 scans the outbound datastream for outbound trigger events. Preferably, this is done by scanning the returned datastream for special Universal Resource Locators (URLs), HTTP headers, and FORM data within the HTTP protocol. While the preferred embodiment of the present invention scans these preferred elements in the HTTP protocol, other elements in other communication protocols may be scanned without departing from the principles of the present invention. Preferably, event response generator 34 performs any actions for detected trigger events in accordance with the action map data returned in the outbound datastream and the event configuration data in configuration file 38 is modified to comply with the returned action map data. Event response generator 34 then preferably deletes the action map data from the outbound message and stores it with the event configuration data in configuration file 38.

Preferably, system 10 is a program implemented in the C computer programming language and operates on a personal computer (PC) or the like. At a minimum, the computer executing system 10 should have an Intel 80486 processor or equivalent, 16 MB of RAM, 500 MB of hard disk space, a VGA monitor, keyboard and a mouse. Preferably, the program implementing system 10 operates on a computer using a Windows operating environment. For 16 bit processors, the program preferably operates in the Windows 3.1 or Windows for Work Groups 3.11 environments and is preferably compatible to operate in the process space of a sixteen (16) bit WINSOCK program or as a plug-in application to the Netscape Navigator 3.0 browser application. For 32 bit processors, the program implementing system 10 preferably operates in the Windows 95 or NT environments and preferably operates in the process space of a thirty-two (32) bit WINSOCK or as a plug-in application with the Netscape Navigator 3.0 browser or as an Active-X control program for the Microsoft Explorer 3.0 browser.

At activation of system 10, event response generator 34 generates an action menu which is sent to the application program. The application program displays the action menu and so the user may make selections which configure the system. Preferably, the action menu is comprised of HTML controls which invoke Javascript commands to modify action map configuration data for a specified server site. Preferably, the action map configuration data are a string of digits which compose a data map where each digit defines a control action. This preferred form of action map data is then preferably transferred from the application program to system 10 in a specially defined cookie data field of the HTTP header for the HTML file returned to system 10.

If the user chooses to configure the system, the user uses the action menu to identify the server site which corresponds to the action map data configured by the user. Preferably, the server site is identified by its domain name. The action map data is used by the event response generator to assign values to the event configuration data that define the trigger events for which event response generator 34 is to perform an action. The server site identification, the action map data and the event configuration data are stored in configuration data file 38. Thus, event response generator 34 locates the domain address of a server site in an incoming message and searches configuration data file 38 for a corresponding server site identifier. The action map data and event configuration data are then used to process trigger events detected by scanner 32.

Preferably, the action map data includes a ten digit field which identifies ten actions a user may specify for restricting access to a user's computer. The preferred action map data is defined as:

| MAP DATA DIGIT POSITION | ACTION | VALUES |
| --- | --- | --- |
| 1 | temporary storage | '0' = no temporary storage of displayed data<br>'1' = temporary storage of displayed data |
| 2 | disk storage | '0' = no disk storage of server data<br>'1' = allow disk storage of server data |
| 3 | hidden data return | '0' = no return of server hidden data<br>'1' = allow return of server hidden data |
| 4 | relayed server data | '0' = no relayed server data displayed<br>'1' = relayed server data displayed |
| 5 | storage of relayed server data | '0' = no relayed server data stored<br>'1' = relayed server data stored |
| 6 | server programs in display window | '0' = no program execution in display window<br>'1' = program execution in display window |
| 7 | server programs on user's computer | '0' = no program execution on user's computer<br>'1' = program execution on user's computer |
| 8 | e-mail user information | '0' = no browser or e-mail user data to server<br>'1' = browser or e-mail user data to server allowed |
| 9 | page updates | '0' = no page updates<br>'1' = page updates allowed |
| 10 | disk access | '0' = disk access disabled<br>'1' = disk access allowed |

In the preferred implementation, the most significant digit in the preferred 10 digit action map data defines whether hidden data from a server site is displayed in the browser. In response to this digit having a value of '0', event response generator 34 deletes cookie values in an HTTP header or in embedded script "document.cookie" commands of a datastream received from the server site, sets the cache value in the HTTP header so data is not stored in the cache of the user's computer, and deletes at browser initiation or termination cookie data in the "cookies.txt" file which were received from unauthorized servers. In response to this digit having a value '1', event response generator 34 deletes the expiration dates for cookie data in HTTP header so the cookie values from the server site may be received, sets the cache value in the HTTP header so data is not stored in the cache of the user's computer, and deletes at browser initiation or termination cookie data in the "cookies.txt" file which were received from unauthorized servers. The second digit of the preferred action map data defines whether data from a server is stored on the user's disk drive. In response to this digit having a value of '0', event response generator 34 deletes cookie values in an HTTP header for a datastream received from the server site, sets the cache value in the HTTP header so data is not stored in the cache of the user's computer, and deletes at browser initiation or termination cookie data in the "cookies.txt" file which were received from unauthorized servers. In response to this digit having a value '1', event response generator 34 allows cookie values with valid expiration dates to be stored in the "cookies.txt" file and datastreams from a server may be stored in the cache of the user's computer and on the user's disk drive. The third digit of the preferred action map data defines whether data from a server stored on a user's disk drive may be returned to the server. In response to this digit having a value of '0', event response generator 34 deletes all cookie values in an HTTP header for outgoing datastreams to the server site. In response to this digit having a value '1', event response generator 34 allows cookie values to be returned to the server site which sent them in a previous datastream. The fourth digit of the preferred action map data defines whether a server can request data from another site for display by a user's browser. In response to this digit having a value of '0', event response generator 34 deletes all HTML "<IMG src='URL'>" statements where the URL identifies a server other than the one with which communication is active. In response to this digit having a value '1', event response generator 34 allows GET requests for URLs from other server sites to be sent to the user's computer for display. The fifth digit of the preferred action map data defines whether a server can request data from another site be sent to the user's browser for storage. In response to this digit having a value of '0', event response generator 34 deletes all HTML "Set Cookie" statements where the URL in the datastream identifies a server other than the one with which communication is active and no cache storage is allowed for datastreams having a server address different from the one with which communication is currently active. In response to this digit having a value '1', event response generator 34 allows cookies from other server sites to be stored on the user's computer.

Continuing with the description of the preferred implementation, the sixth digit in the preferred 10 digit action map data defines whether programs from a server may be executed in the display of a user's browser. In response to this digit having a value of '0', event response generator 34 disables HTML SCRIPT and APPLET tags as well as Javascript "document.applet" commands. In response to this digit having a value '1', event response generator 34 allows HTML SCRIPT and APPLET tags as well as Javascript applets to execute in the display of a user's browser. The seventh digit of the preferred action map data defines whether programs from a server may execute on a user's computer. In response to this digit having a value of '0', event response generator 34 disables HTML OBJECT and EMBED tags as well as Javascript "document.embed" commands. In response to this digit having a value '1', event response generator 34 allows HTML OBJECT and EMBED tags as well as Javascript embedded commands to execute on the user's computer. The eighth digit of the preferred action map data defines whether browser and e-mail user information data may be sent to a server. In response to this digit having a value of '0', event response generator 34 deletes "User-Agent" and "From:" fields from HTTP headers of outbound datastreams. In response to this digit having a value '1', event response generator 34 allows HTTP headers having "User-Agent" and "From:" fields to be transmitted in outbound datastreams. The ninth digit of the preferred action map data defines whether page updates from a server may be received by a user's browser. In response to this digit having a value of '0', event response generator 34 deletes all "Connection:keep-alive" and "refresh" statements from HTTP headers in inbound datastreams. In response to this digit having a value '1', event response generator 34 allows "Connection:keep-alive" and "refresh" statements to remain in HTTP headers in inbound datastreams so they are processed by a user's browser. The tenth digit of the preferred action map data defines whether disk I/O is active during network communication. In response to this digit having a value of '0', event response generator 34 allows disk I/O to remain active during an active TCP/IP socket connection. In response to this digit having a value '1', event response generator 34 disables disk I/O whenever a TCP/IP socket connection is active. Although these are the preferred actions and their preferred implementations in the present invention, other actions and implementations may be used without departing from the principles of the present invention.

As noted in the discussion of the actions in the preferred action menu, some actions pertain to more than one type of trigger event. Preferably, the trigger events and the corresponding response for each event are maintained in event configuration data. Preferably, the event configuration data are defined as:

actions to the trigger events for which scanner 32 scans. In the preferred implementation, the most significant digit in the preferred 12 digit map data defines whether cookie values in an HTTP header for a data message received from another computer are modified or stored in a "cookies.txt" file. As shown in the table, a zero value for the digit indicates that no modifications are made to cookie values in the header, a "1" value for the digit indicates that a user may modify the value before it is returned to the computer which sent the message with the cookie data in the header, and the value "2" causes the file ("cookies.txt") in which cookie data are normally stored to be deleted upon initiation of the application program or upon termination of the application program. For the second map data digit, the value zero permits refresh files to be received and displayed by the application program and the value "1" deletes refresh file requests from outbound datastreams. Refresh files are typically HTML files sent by a server to update an area within a previously transmitted page. The third map data digit determines whether repeat images from the server are displayed by the application program. A value of zero permits the repeat data files to be received and displayed, a value of "1" preferably causes the TCP/IP socket to close after a Web page has been downloaded so repeat data files are not received. The fourth map digit defines whether MIME encoded files are decoded and displayed by the application program. A value of zero permits all MIME encoded files to be decoded and used by the application file, a value of "1" permits those MIME files containing text and image data only to be received and decoded by the application program, and the value "2" permits those MIME files containing text only to be received and decoded. The fifth map data digit

| MAP DATA DIGIT POSITION | RESTRICTION | VALUES |
|---|---|---|
| 1 | cookie_modifications | '0' = no modifications<br>'1' = modify name = value statement or expiration date for cookie value<br>'2' = delete cookies.txt at start-up/shut down |
| 2 | refresh, | '0' = allow always<br>'1' = delete always |
| 3 | keep_alive, | '0' = allow always<br>'1' = delete always |
| 4 | mime_type, | '0' = allow all<br>'1' = text and image only<br>'2' = text only |
| 5 | script,<br>(Java Script or VBS) | '0' = allow always<br>'1' = disable always |
| 6 | script_cookie, | '0' = allow always<br>'1' = disable always |
| 7 | script_submit, | '0' = allow always<br>'1' = disable always |
| 8 | script_embed, | '0' = allow always<br>'1' = disable always |
| 9 | applet,<br>(Java) | '0' = allow always<br>'1' = disable always |
| 10 | embed,<br>(Plug In) | '0' = allow always<br>'1' = disable always |
| 11 | object;<br>(Active X) | '0' = allow always<br>'1' = disable always |
| 12 | Virtual RAM Drive | '0' = disable<br>'1' = enable |

Thus, the event configuration data defines the actions to be performed for each type of trigger event. When event response generator receives an action map from the user's browser, the event configuration data is modified to conform to the action map. In this manner, the user need only specify actions and the inventive system correlates the specified either allows or disables execution of script commands received in a datastream. A value of zero for this digit permits the application program to receive and execute script commands while a value of "1" causes the scanner to disable script commands. Preferably, script commands are disabled by placing a comment character before the script command so the detected script command may be displayed by the application program for the user. In the preferred implementation, detected script commands are in Javascript or Visual Basic Script (VBS) languages. The sixth map data digit determines whether cookie data in script commands are permitted. That is, cookie data may be defined in script commands to avoid being detected in HTTP headers. If this map digit is zero, the script cookie data are received and used by the application program. If the map data value is "1", detected cookie data in script commands are disabled and displayed by the application program for the user so the user may determine whether receipt of the cookie data in the script command is allowed. The seventh digit in the map data determines whether a FORM "submit" script command will be provided to the application program. A digit value of zero allows FORM "submit" script commands to be received and executed by the application program and the value of one causes the scanner to disable the FORM "submit" command so it may be displayed for the user by the application program without execution. The eighth digit in the map data determines whether a script program may execute a plug-in program using an "embed" command. A value of zero permits script programs to execute plug-in programs with "embed" commands and a value of "1" causes event response generator 34 to disable "embed" commands for plug-in programs in script programs. Preferably, script commands are disabled by either placing a comment character in front of the command which invokes the program or by inserting a return statement as the first statement in the imbedded program function so the body of the imbedded program function is not executed. The ninth digit of the map data determines whether an applet program is received and executed. When this digit is a zero, applet programs may be received and executed by the application program and when this digit is a "1", event response generator 34 disables the applet program. Again, the preferred implementation disables the applet program by either placing a comment character before the command invoking the program or placing a return statement as the first statement in the applet program. The tenth digit in the map data determines whether imbedded programs for a plug-in application are received and executed by the application program. A value of zero for this digit permits imbedded programs to be received and executed by the plug-in application and a value of "1" disables the imbedded programs for the plug-in application. Again, the preferred implementation disables imbedded programs or plug-in applications in the manner discussed with respect to applet programs. The eleventh map data digit determines whether data objects are passed and used by the application program. The map value of zero permits data objects to be received and used by the application program and a value of "1" disables data objects so a detected object may be displayed by the application program for the user. The data object is preferably disabled by placing a comment character in front of the command which uses the data object or by detecting the program portion component of the data object and disabling it by putting a return statement as the first statement in the program portion of the object. In the preferred implementation, data objects are typically data objects written in the Active X language. The twelfth digit of the map data determines whether disk I/O is disabled. When the value of this digit is at zero, disk I/O is disabled and files and data are written to a RAM area. When this digit is a one, files and data may be stored on a disk drive.

Figure 2:
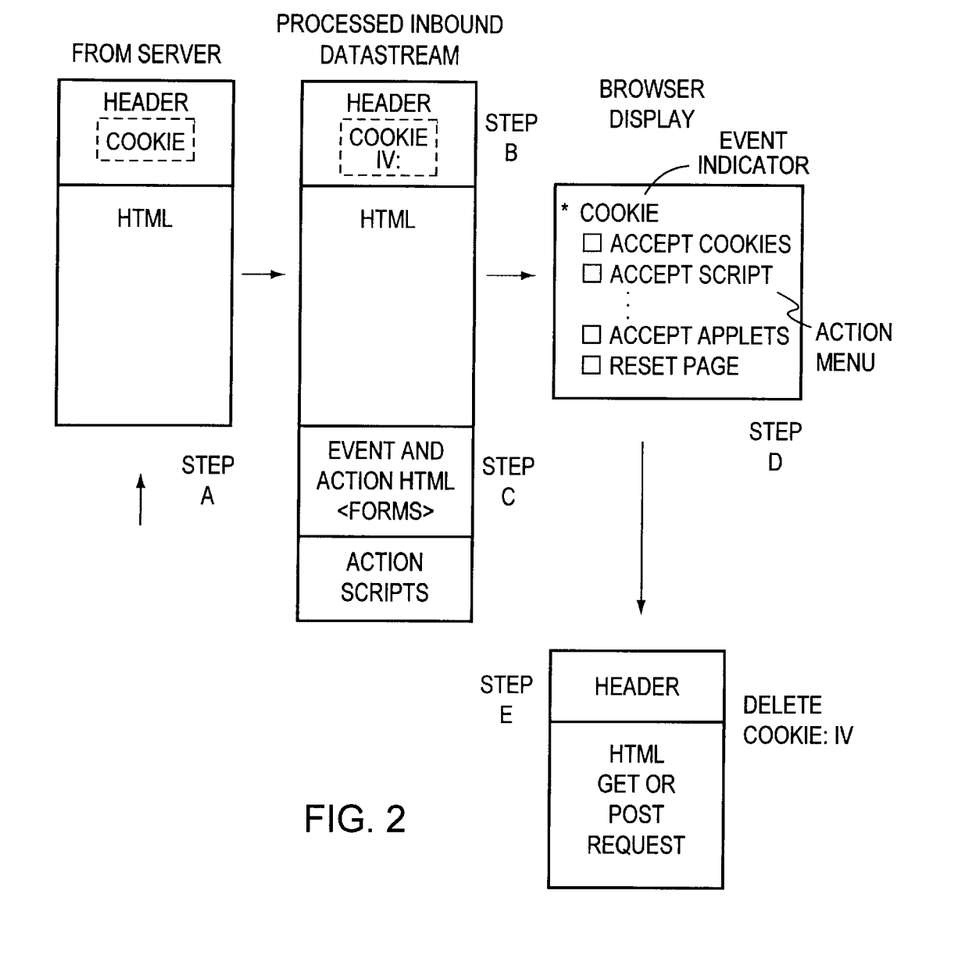
FIG. 2 is a block diagram of HTML file processing performed in a preferred aspect of the present invention.
Figure 3:
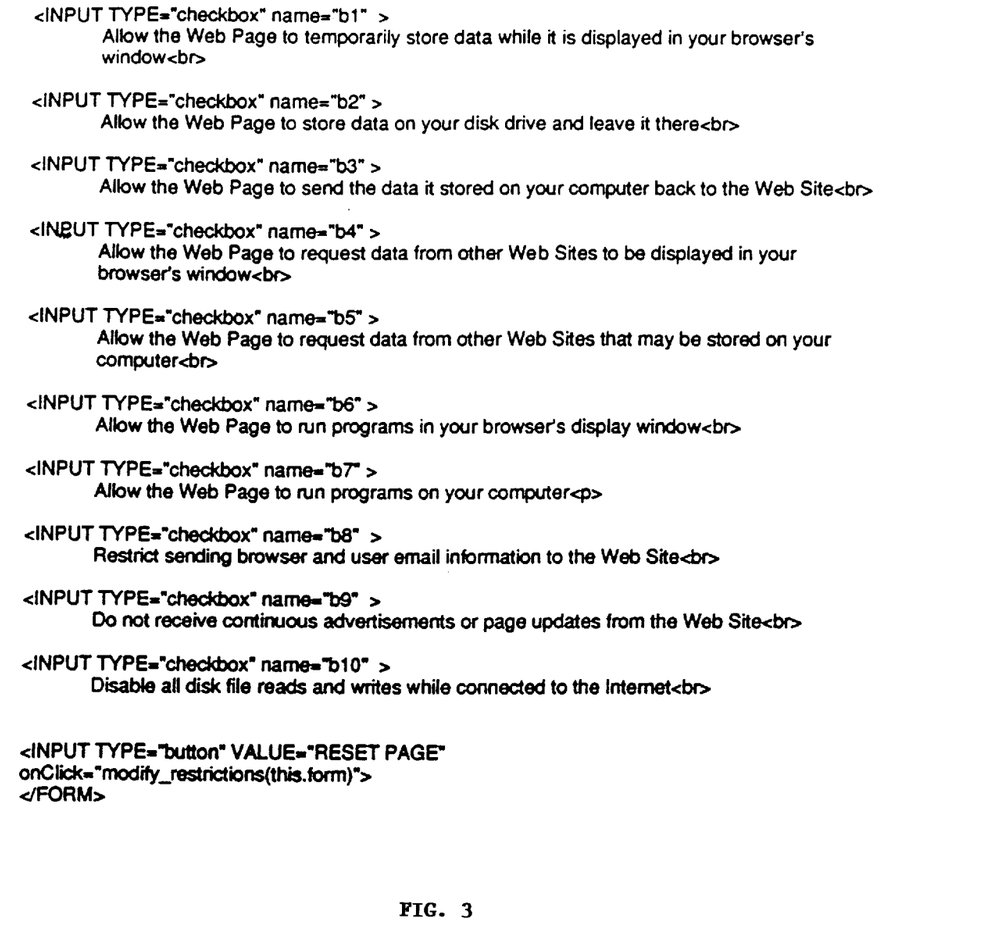
FIG. 3 is an exemplary HTML <FORM> used to accept user input to modify action map data for processing trigger events.
Figure 4:
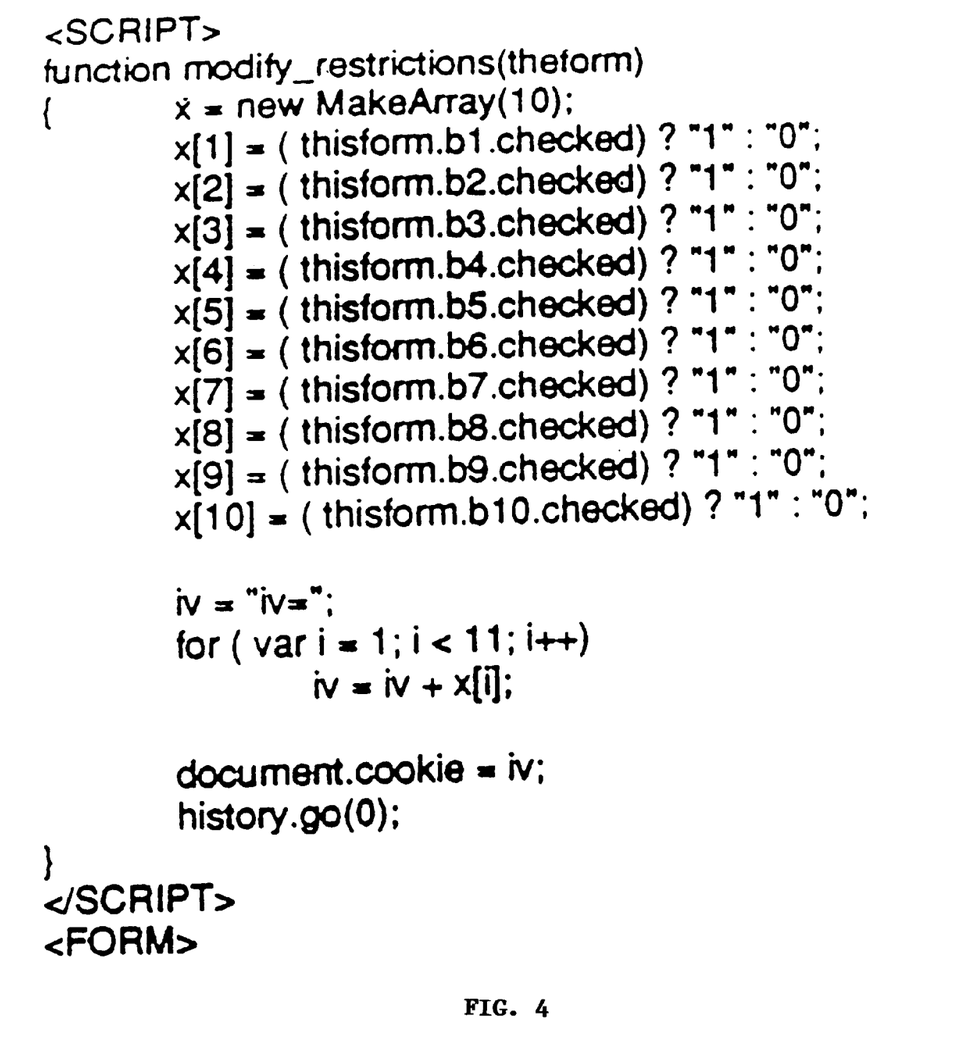
FIG. 4 is an exemplary Javascript program used to modify the action map in accordance with the user input received from the HTML <FORM> shown in FIG. 3.

In the preferred implementation, the action map data is assigned by a "Cookie:iv=map data" statement. The "cook-ie:iv" portion of the statement specially defines the cookie data as being generated by system 10 so system 10 can distinguish the cookie data used to control system 10 from cookie data sent from a server site or the application program. A diagramatic depiction of the preferred processing of an HTML file by system 10 is shown in FIG. 2. As shown there, a server sends an HTML file having cookie data in the HTTP header (Step A). This file is intercepted by system 10 and scanned to detect trigger events in accordance with event configuration data stored in configuration file 38 which corresponds to the server. Scanner 32 determines which configuration data to use by extracting the server address in the HTTP header and searching configuration file 38 for an entry which corresponds to this server address. If one is located, the information in the corresponding event configuration data is used by scanner 32 to detect trigger events and action map data are used by event response generator 34 to generate appropriate responses for the trigger events detected by scanner 32. If no corresponding configuration data have been stored for the server site, a default action map value is used to set default event configuration data. In the preferred implementation, the default action map value is "iv=0000000001", although other values may be used. The action map data are stored in the HTTP header of the processed datastream (Step B). Event response generator 34 also couples an HTML file to one end of the datastream, preferably, at the trailing end of the intercepted datastream (Step C). A preferred HTML form used to accept user input for modification of the preferred action map data is shown in FIG. 3. Preferably, other HTML <FORMS> may be included in the HTML file to provide the user with event indicators and other action options such as server administrator inquiries and responsive e-mail generation as discussed below. In the preferred HTML <FORM> for the preferred action map, the "reset page" option permits a user to request the datastream for the downloaded page from the server again so it may be processed with the new event configuration data before it is delivered and displayed by the user's browser. Coupled to the end of the preferred HTML file generated by event response generator 34 is a Javascript program which performs the actions presented in the action menu. A preferred implementation of a Javascript program for modifying the action map data is shown in FIG. 4.

The processed datastream with the specially defined cookie field and trailing HTML file is passed to the browser for display (Step D, FIG. 2). The HTML forms of the trailing HTML file are displayed to reveal event indicators and the action menu to the user. The HTML form for the event indicators may accept activation by the user to display the detected trigger event in the HTML file for the processed datastream. For example, if an event detector indicates an applet program has been detected, a user may "click" on the indicator so the HTML source code for the detected applet program is displayed to the user. The displayed program contains the comment character or return statement used to disable the program. In this manner, a user may view detected trigger events and determined whether the detected trigger event is acceptable to the user.

When the application program sends a subsequent GET or POST request to the server site, the HTTP header containing the "cookie:iv" field is used for the message. Event response generator 34 reviews the action map data in the "cookie:iv" field and modifies the corresponding event configuration data. It then performs actions on the outbound message in accordance with the modified event configuration data. The "cookie:iv" data is extracted and stored in the configuration file so it corresponds to the server site address and event configuration data. The "cookie:iv" data is then deleted from the HTTP header and the GET or POST request is provided to the communication stack for transmission to the server site (Step E). The next HTML file received from the server is then evaluated in terms of the new configuration data stored in configuration file 38 for the server site (Step A).

In this manner, a user may first request a page from a server site and have the HTML file processed by system 10 before it is delivered to the application program. As a result, a user is informed of all detected trigger events. If any of the trigger events include programs or commands, the user may view those and determine whether the actions performed by the program or command are acceptable to the user. If that is the case, the user may select the action in an action menu which modifies the action map data so subsequent messages from the server which contain programs are executed. The user may then request the page from the server again and, this time, the program is not disabled by event response generator 34. Thus, when it is delivered to the application program, it will be executed.

Because trigger events are detected and processed without user intervention, system 10 can process an entire page from a server and then deliver the processed page to the application program with the detected trigger events disabled. Previously known programs that detected or deleted cookie data from HTTP headers were unable to detect and disable interpretive programs and embedded cookie commands. Previously known browsers that disabled interpretive programs and embedded cookie commands did not notify the user of disabled interpretive programs and embedded cookie commands. The system of the present invention provides a program which may execute in the application space with a browser or overload part of the communication socket program to detect and delete cookie data from HTTP headers as well as notify a user of interpretive programs and embedded cookie commands disabled by the system. With the system of the present invention, a user may view a complete page with the detected trigger events disabled, be notified of the detected trigger events and then determine whether detected trigger events are acceptable for subsequent datastreams.

Preferably, the trigger events which are to be disabled include trigger events in both incoming and outgoing datastreams. The preferred trigger events detected in incoming datastreams may be classified as embedded identifiers, embedded commands, and unidentified file requests. Examples of each of these types of event triggers are now given; however, the reader should understand that the present invention is not limited to these examples or to the exemplary classifications of event triggers discussed herein. Three examples of embedded identifiers are a "Set Cookies" string in the HTTP header of a datastream, a Cookie or FORM field having a "Name=value" string, and a "type=hidden" string in a FORM INPUT field of a datastream although other methods or mechanisms for delivery of identifier strings may be detected by scanner 32 of system 10. Other examples of an embedded identifier in an incoming datastream are a "document.cookie" or "submit( )" string in a Javascript programming language statement in a Javascript program.

Examples of embedded commands include any commands which activate or execute a program or applet. Programs which may be activated by an embedded command include those written in the JAVA script or Visual Basic Script languages. Also, JAVA applets, Navigator plug in applications, and Microsoft Active-X control applications are programs that may be activated by embedded commands. For example, the HTML tag "APPLET" may be used to invoke a JAVA applet, the "EMBED" HTML tag may be used to invoke Netscape plug-in of applications, and the "SCRIPT" HTML tag may be used to invoke Javascript or Visual Basic Script programs. Thus, identification of these HTML tags in a file received from a server site is a detection of a trigger event for an embedded command. Also, Javascript programs received from a server site are scanned to determine if a "document.applets" string or "document.embeds" string is contained in the Javascript program. These two examples of JAVA script language statements are used to invoke a JAVA applet or a Netscape plug-in application, respectively. Again, these commands which activate programs or applets are merely examples of the types of commands which may be detected by scanner 32 in a scan of an HTML file or downloaded program or applet file.

An example of an unidentified file request in an incoming datastream is "IMG SRC="<URL". This tag may be used in an HTML file to automatically down load image files from a URL other than the original URL. Thus, scanner 32 detects the HTML tag which would result in a request for additional URLs which have a server address other than one with which the user's browser is communicating.

For outgoing datastreams, scanner 32 verifies that all requested URLs are URLs which are identified in the HTML files for the page being viewed. Another example of a scan of an outgoing datastream is a scan of the HTTP header to see if the header contains HTTP cookie data. Finally, scanner 32 may be activated to overwrite information in HTTP headers such as the User-Agent identifier field, cookie expiration date, the cache storage field or an E-mail identification address. These events are discussed above with respect to the preferred action map data.

For each type of trigger event, there are preferably, three types of actions which may be presented in the action menu or defined by the configuration data. These action types are (1) sending an E-mail message to the system administrator for the server site which caused the trigger event, (2) termination of the present communication session with the server site, and (3) modification of the action data for the server site to alter the response of system 10 to detected trigger events. Each type of trigger event may be individually defined and one or more actions identified for presentation upon occurrence of a trigger event. Preferably, the event indicators and the actions to be presented to a user upon the occurrence of a trigger event are generated by event response generator 34.

Figure 5:
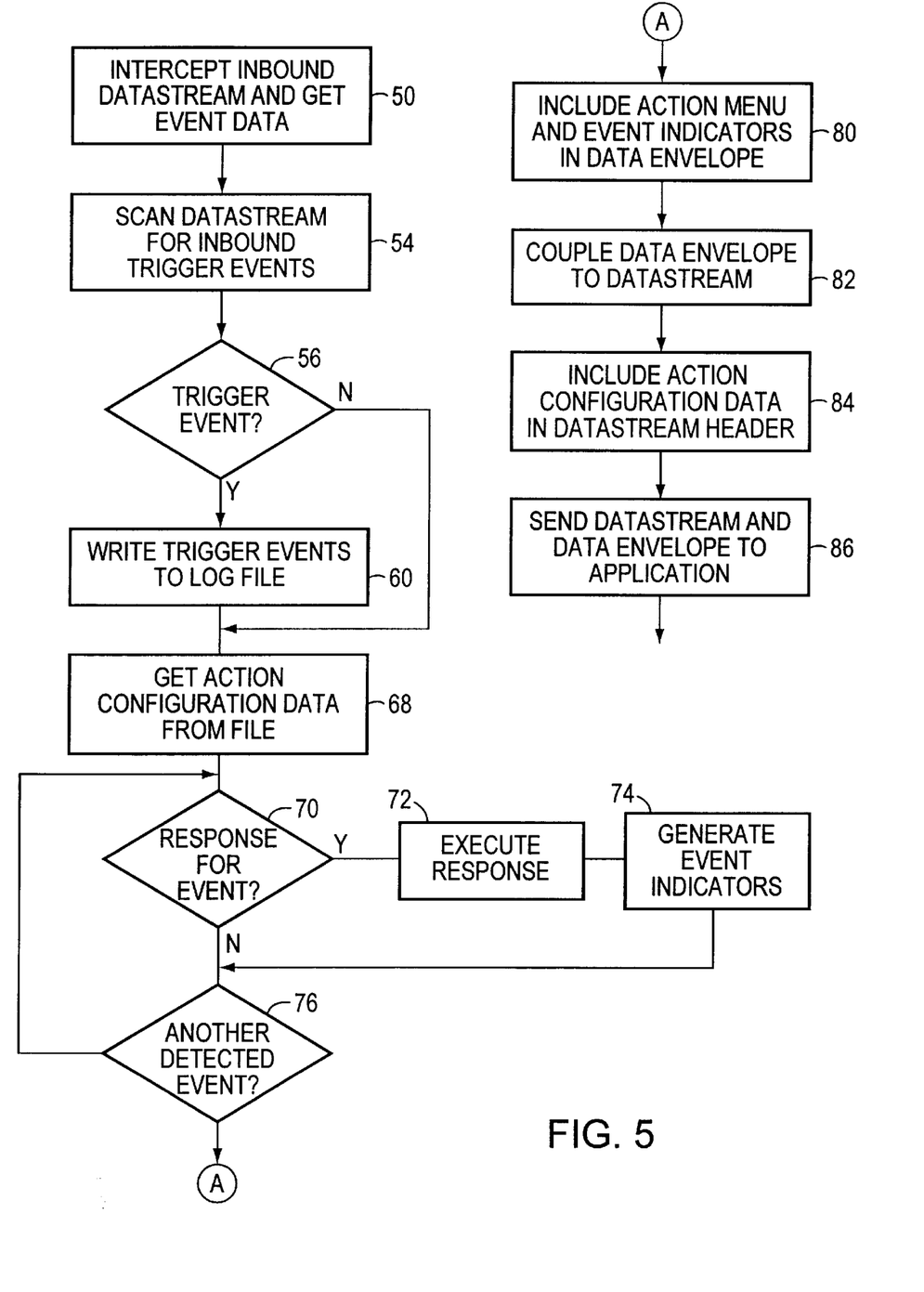
FIG. 5 is a flowchart of a preferred method of processing inbound datastreams performed by the system shown in FIG. 1.

The preferred method implemented by system 10 for inbound data messages is shown in FIG. 5. The method begins by intercepting a datastream before it is received by the application program in the application space shared with system 10 and the event configuration data are retrieved from configuration file 38 (block 50). The datastream is scanned for trigger events defined by event configuration data corresponding to the server which sent the datastream (block 54). The reader should appreciate that the term datastream includes the data components of a data communication between computers as well as the header information for the data segment. If the scan of the datastream indicates a trigger event is present (block 56), the process writes the detected trigger events to a log file (Block 60). Regardless of whether trigger events were detected or not, action map data corresponding to the server site which generated the inbound datastream is placed in the header of the HTML file containing the processed datastream (Block 68). If action map data corresponding to the server site is not available, the default value for action map data is used instead. The process then determines whether the action map data indicate a response should be generated for a detected trigger event (Block 70). If a response is indicated by the action map data, the response is executed (Block 72) and an event indicator for the processed trigger event is included in a data envelope (Block 74). For example, if an applet program is detected, the executed response results in the applet program being disabled and an HTML statement to display an event indicator is included in the data envelope for display by the application program. Preferably, the data envelope is the HTML file coupled to one end of the datastream as discussed above. This process is repeated for each protected trigger event (Block 76) until all of the detected trigger events have been processed. The process then generates an action menu providing selections for the detected trigger events (Block 78) and the action menu is included in the data envelope (Block 80). The data envelope is then coupled to one end of the datastream (Block 82) and the action map data used to process the datastream is placed in the header of the datastream (Block 84). The processed datastream and data envelope coupled to the datastream are then provided to the application program (Block 86).

The datastream and coupled data envelope are then displayed by the application program and the user may view the detected events. A user may then select an action in the action menu. In the preferred implementation, the actions in the action menu are performed by a script program invoked from the action menu. The actions available to a user in the preferred implementation include obtaining more information about the server site which sent the detected trigger event or modification of the action map data so a trigger event may be used or executed. For example, to obtain more information about the server site, the user may send a WHOIS query to the domain name registration authority. This query is sent in the preferred embodiment by establishing a HTTP session, or alternatively a TELNET communications session, for transmission of the query to the domain name registration authority. The response to the query identifies the owner of the server site, its administrator, company name, and e-mail address. The user may now activate a selection in the action menu to send the identified administrator an e-mail regarding the detected trigger event. In the preferred implementation, a default message is provided for transmission to the administrator. In another aspect of the preferred implementation, the user may activate a selection in the action menu to send a FINGER query to the server site to obtain information regarding the administrator of the site. This information may also be used to send an e-mail to the administrator regarding the detected trigger event. After viewing the detected trigger event, a user may determine that the detected trigger event is acceptable to the user. In this case, the user selects an action from the action menu which modifies a value in the action map data so that subsequent transmissions permit the trigger event to be received and used or executed.

Figure 6:
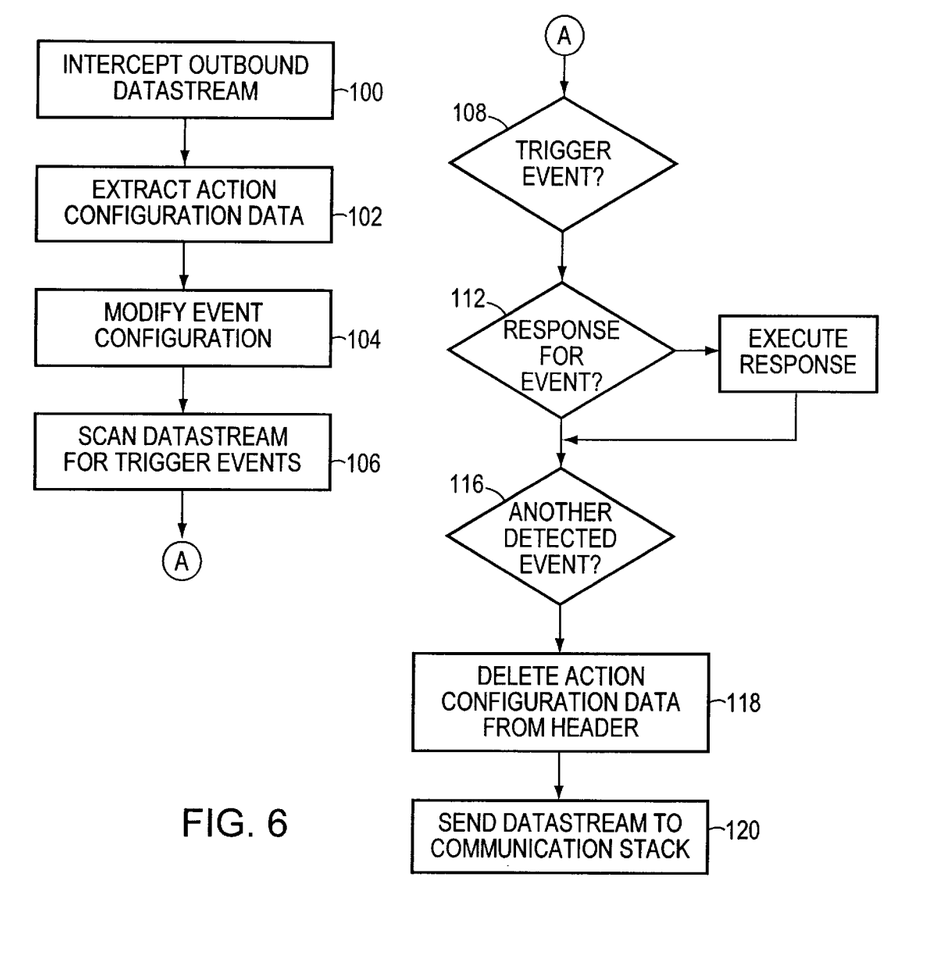
FIG. 6 is a flowchart of a preferred process of processing outbound datastreams performed by the system shown in FIG. 1.

Processing for outbound datastreams from the application program is shown in FIG. 6. The process begins by intercepting the outbound datastream before it is delivered to the communications stack (Block 100). The action map data is extracted from the datastream (Block 102) and used to modify event configuration data for the corresponding server site (Block 104). The datastream is then scanned for outbound trigger events using event configuration data (Block 106). If a trigger event is detected (Block 108), the action map data is used to determine whether a response for a detected trigger event is to be generated (Block 112). If there is, the response is generated (Block 114). This continues for each detected trigger event (Block 116) until all of the detected trigger events have been processed. The action map data is then deleted from the header of the response (Block 118) and the datastream is then sent to the communication stack for delivery to the server site (Block 120).

In operation, a user installs system 10 of the present invention on a computer as it is activated with an application program. Preferably, the installation associates system 10 with a user's browser so system 10 is activated whenever a user activates the browser. Thereafter, when the user activates the browser, system 10 operates to intercept outbound datastreams before they are processed by communication stack 12 and intercept incoming datastreams before they are processed by the user's browser. These datastreams are scanned to detect trigger events and detected trigger events are logged. If a response for a detected trigger event is identified by configuration data, the response is generated. Event indicators and an action menu are then generated and an HTML file containing event indicators and the action menu is coupled to the datastream. The action map data is also stored in the header of the datastream. The event indicators and action menu are presented and any action selected by the user is executed. If no trigger event is found in a datastream, an action menu is coupled to the datastream for delivery to the application program so the user can modify the action map data, if desired.

The actions identified within the action menu allow a user to obtain more information about the server site which delivered the datastream containing the detected trigger events. This information may be used to activate actions in the action menu which send e-mail or other electronic messages to the administrator. Additionally, the user may modify the action map data to accept a detected trigger event or further restrict trigger events received from the server site. The modified action map data is stored in the header of a datastream for an outbound request message. The request message is intercepted by system 10 and scanned for outbound trigger events. Additionally, the action map data is extracted from the header and stored in the configuration file. The action map data is then deleted from the header of the data request before it is delivered to the communications stack for a transmission to the server site.

While the present invention has been illustrated by the description of the preferred and alternative embodiments and while the embodiments have been described in considerable detail, it is not the intention of the applicant to restrict or anyway limit the scope of the appended claims to such detail. Additional advantages and modifications will readily appear to those skilled in the art. For example, other hidden data fields may be identified as trigger events and other actions may be presented and implemented by the system and method of the present invention. The invention's broader aspects are therefore not limited to the specific details, representative apparatus and method, or illustrative examples shown and described. Accordingly, departures may be made from such details without departing from the spirit or scope of applicant's general inventive concepts.

What is claimed is:

1. A system for responding to trigger events detected in a datastream comprising:

an interceptor for intercepting a datastream before the datastream is processed by an application program;

a scanner for scanning the intercepted datastream and detecting a trigger event in the intercepted datastream;

an event response generator for generating a response having event indicators to said detected trigger event in correspondence with action map data so that said detected trigger events may be displayed and said event indicators and an action menu are included in a data envelope of the scanned datastream for delivery to an application program.

2. The system of claim 1 wherein the interceptor intercepts the datastream in the application space of the application program for which datastreams are being intercepted.

3. The system of claim 1, the interceptor including a communication socket which executes as a process in a top layer of a communication stack, the communication socket for providing the intercepted datastream to the scanner prior to generation of a signal indicating the datastream is available for the application program.

4. The system of claim 1 wherein the data envelope is an HTML file.

5. The system of claim 4 further comprising:
a script language program for implementing said action menu.

6. The system of claim 1 wherein the event response generator generates a response for a detected trigger event in an outbound message in correspondence with a user's modification of the action map data.

7. The system of claim 1 wherein said scanner detects one of an embedded identifier, unidentified file request, and an embedded command.

8. The system of claim 1 wherein the embedded command is one of an identifier assignment, a hidden command, and an execution command.

9. A method for detecting and responding to trigger events in a datastream comprising:
intercepting a datastream before the datastream is processed by an application program;
scanning the intercepted datastream and detecting a trigger event in the intercepted datastream;
generating a response to said detected trigger event in correspondence with configuration data, the response including displaying an action menu including one or more user selectable options corresponding to actions to be executed in response to the detected trigger event; and
generating a log of detected trigger events.

10. The method of claim 9, said datastream scanning further comprising:
detecting one of an embedded identifier, unidentified file request, and an embedded command; and
notifying the user of the detection.

11. The method of claim 10 further comprising the step of:
disabling said detected command.

12. The method of claim 9, the detected trigger event generation further comprising:
generating an event time, trigger event source identifier, trigger event identifier, and a selected action identifier for the log of trigger events.

13. The method of claim 12, the detected trigger event generation further comprising:
generating file identifiers for the log of trigger events, the file identifiers identifying files corresponding to the detected trigger event.

14. The method of claim 9 wherein the intercepting step:
intercepts the datastream at a communication socket level.

15. The method of claim 9 wherein the intercepting step intercepts the datastream in an application process space for a browser program.

16. The method of claim 9 further comprising:
generating event indicators for detected trigger events; and
delivering said event indicators to the application program in a data envelope.

17. The method of claim 16 further comprising:
encapsulating said event indicators and an action menu in a data envelope; and
coupling the data envelope to the datastream for delivery to the application program.

18. The method of claim 17 wherein the encapsulating step encapsulates the event indicators and the action menu in an HTML file.

19. A system for responding to trigger events detected in a datastream comprising:
an interceptor for intercepting a datastream before the datastream is processed by an application program;
a scanner for scanning the intercepted datastream and detecting a trigger event in the intercepted datastream;
an event response generator for generating a response to said detected trigger event, the response including displaying an action menu including one or more user selectable options corresponding to actions to be executed in response to the detected trigger event.

20. The system of claim 19 wherein said scanner detects one of an embedded identifier, unidentified file request, and an embedded command.

21. The system of claim 20 wherein the embedded identifier is a cookie data field in a header of the scanned datastream.

22. The system of claim 20 wherein the unidentified file request is one of a user Universal Resource Locator (URL) and a URL request in a downloaded file.

23. The system of claim 20 wherein the embedded command is one of an identifier assignment, a hidden command, and an execution command.

24. The system of claim 19, the event response generator generating an action menu identifying an electronic mail (e-mail) option, an action map modification option, and an abort option.

25. The system of claim 19 wherein the interceptor intercepts disk input/output (I/O) utility calls so that disk I/O is disabled, the interception of disk I/O being enabled in response to initiation of a communication session with a communication stack.

26. The system of claim 19, wherein the event response is generated in correspondence with action map data.

27. The system of claim 19, wherein the interceptor intercepts the datastream in the application space of the application program.

28. A system for responding to trigger events detected in a datastream comprising:
an interceptor for intercepting a datastream before the datastream is processed by an application program;
a scanner for scanning the intercepted datastream and detecting an identifier selected from the group including a cookie data field in a header of the scanned datastream, an unidentified file request, and an embedded command in the intercepted data stream;
means for notifying a user of the detected identifier;
an event response generator for generating a response to said detected trigger event, the response including displaying an action menu including one or more user selectable options corresponding to actions to be executed in response to the detected trigger event.

29. A system for responding to trigger events detected in a datastream comprising:

an interceptor for intercepting a datastream before the datastream is processed by an application program;

a scanner for scanning the intercepted datastream and detecting an identifier selected from the group including an embedded identifier, a user Universal Resource Locator (URL), a URL request, and an embedded command in the intercepted data stream;

means for notifying a user of the detected identifier;

an event response generator for generating a response to said detected trigger event, the response including displaying an action menu including one or more user selectable options corresponding to actions to be executed in response to the detected trigger event.

30. A system for responding to trigger events detected in a datastream comprising:

an interceptor for intercepting a datastream before the datastream is received by an application program;

a scanner for scanning the intercepted datastream and detecting one of a cookie data field in a header of the scanned datastream, unidentified file request, and an embedded command in the intercepted datastream;

means for notifying a user of the detected identifier, file request or embedded command; and an event response generator for generating an action menu identifying an electronic mail (e-mail) option, an action map modification option, and an abort option.

31. A system for responding to trigger events detected in a datastream comprising:

an interceptor for intercepting a datastream before the datastream is received by an application program and for intercepting disk input/output (I/O) utility calls so that disk I/O is disabled, the interception of disk I/O being enabled in response to initiation of a communication session with a communication stack;

a scanner for scanning the intercepted datastream and detecting one of a cookie data field in a header of the scanned datastream, unidentified file request, and an embedded command in the intercepted datastream;

means for notifying a user of the detected identifier, file request or embedded command; and an event response generator for generating a response to said detected trigger event in correspondence with action map data.

32. A method for detecting and responding to trigger events in a datastream comprising:

intercepting a datastream before the datastream is received by an application program;

scanning the intercepted datastream and detecting a trigger event in the intercepted datastream;

generating a response to said detected trigger event in correspondence with configuration data; and presenting an action menu identifying an electronic mail (e-mail) option, a configuration data modification option, and an abort option.

33. The method of claim 32 further comprising:

locating an e-mail address corresponding to an originator for the detected trigger event; and sending an e-mail message to the located e-mail address in response to the e-mail option in the action menu being selected.

34. The method of claim 32 further comprising:

modifying the detected trigger event in the intercepted datastream before the intercepted datastream is provided to the application program in response to the modification option of the action menu being selected.

35. The method of claim 32 further comprising:

generating an abort message for the application program in response to the abort option of the action menu being selected.

36. A method for detecting and responding to trigger events in a datastream comprising:

intercepting a datstream before the datstream is received by an application program;

scanning the intercepted datastream and detecting an embedded command;

disabling said detected command;

notifying a user of the detected command in the intercepted datastream; and generating a response to said detected command in correspondence with configuration data, the response including displaying an action menu including one or more user selectable options corresponding to actions to be executed in response to the detected trigger event.

37. The method of claim 36 wherein comment characters are placed around said detected command to disable said command.

38. The method of claim 36 wherein a return command is placed at a program invoked by said detected command to disable said command.

39. A method for detecting and responding to trigger events in a datastream comprising:

intercepting a datastream before the datastream is received by an application program;

scanning the intercepted datastream and detecting a trigger event in the intercepted datastream;

generating a response to said detected trigger event in correspondence with configuration data; and disabling disk I/O in response to initiation of a communication session with a communication stack.

40. A method for detecting and responding to trigger events in a datastream comprising:

intercepting a datastream before the datastream is received by an application program;

scanning the intercepted datastream and detecting a trigger event in the intercepted datastream;

generating a response to said detected trigger event in correspondence with configuration data;

generating event indicators for detected trigger events;

encapsulating said event indicators and an action menu in a cookie data field of an HTTP header for an HTML file;

coupling said HTML file to said datastream; and delivering said datastream with said coupled HTML file to said application program.

* * * * *